Sept. 8, 1970  H. SIEBOL  3,526,993
ORCHARD TRELLIS SYSTEM
Original Filed July 28, 1967  2 Sheets-Sheet 1
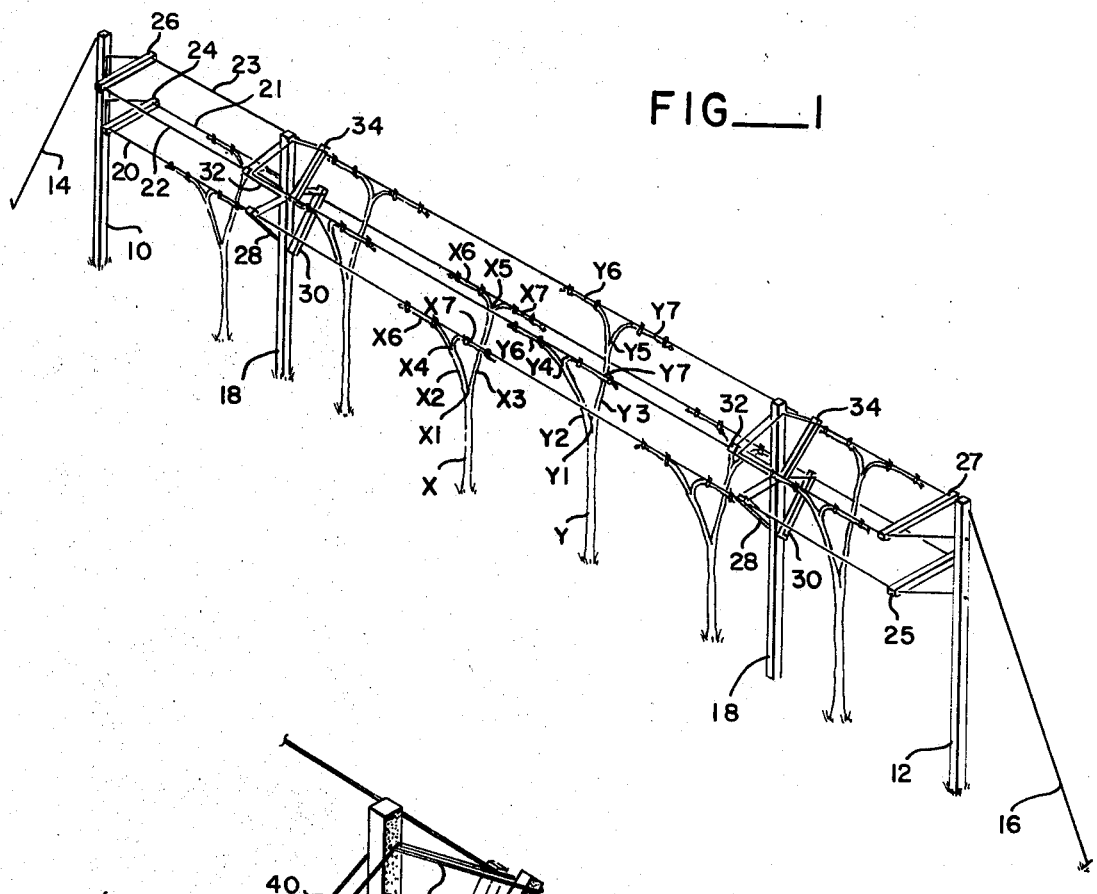
FIG—1
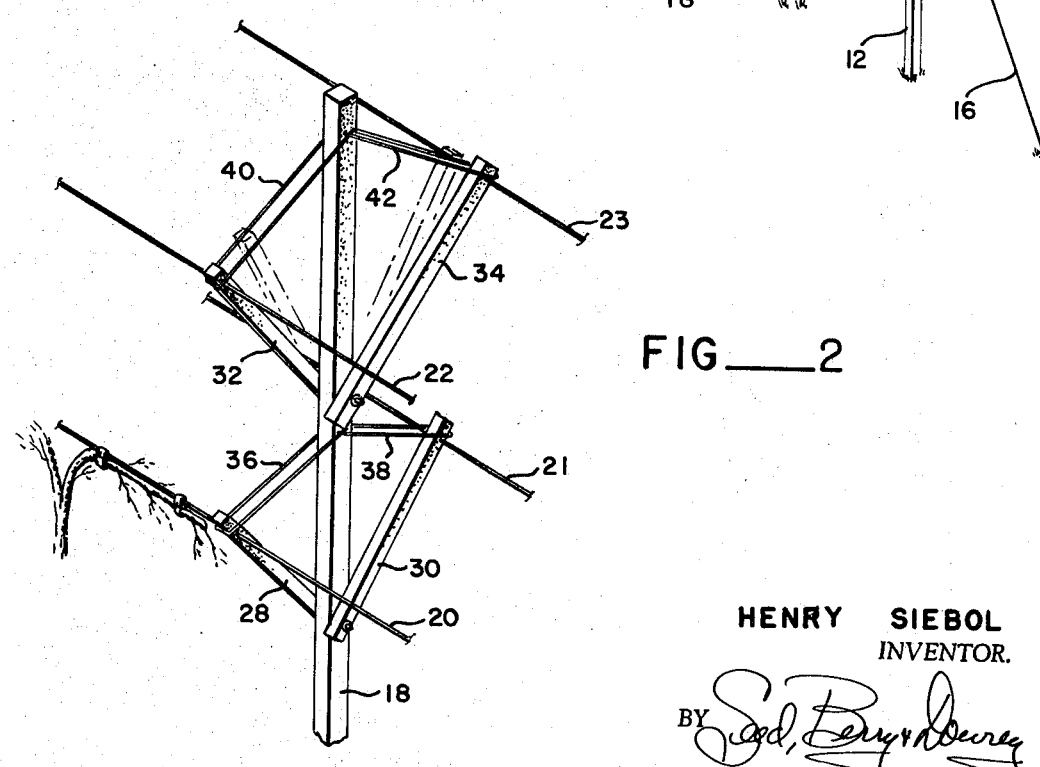
FIG—2
HENRY SIEBOL
INVENTOR.
BY
ATTORNEYS Sept. 8, 1970            H. SIEBOL            3,526,993
ORCHARD TRELLIS SYSTEM
Original Filed July 28, 1967            2 Sheets-Sheet 2
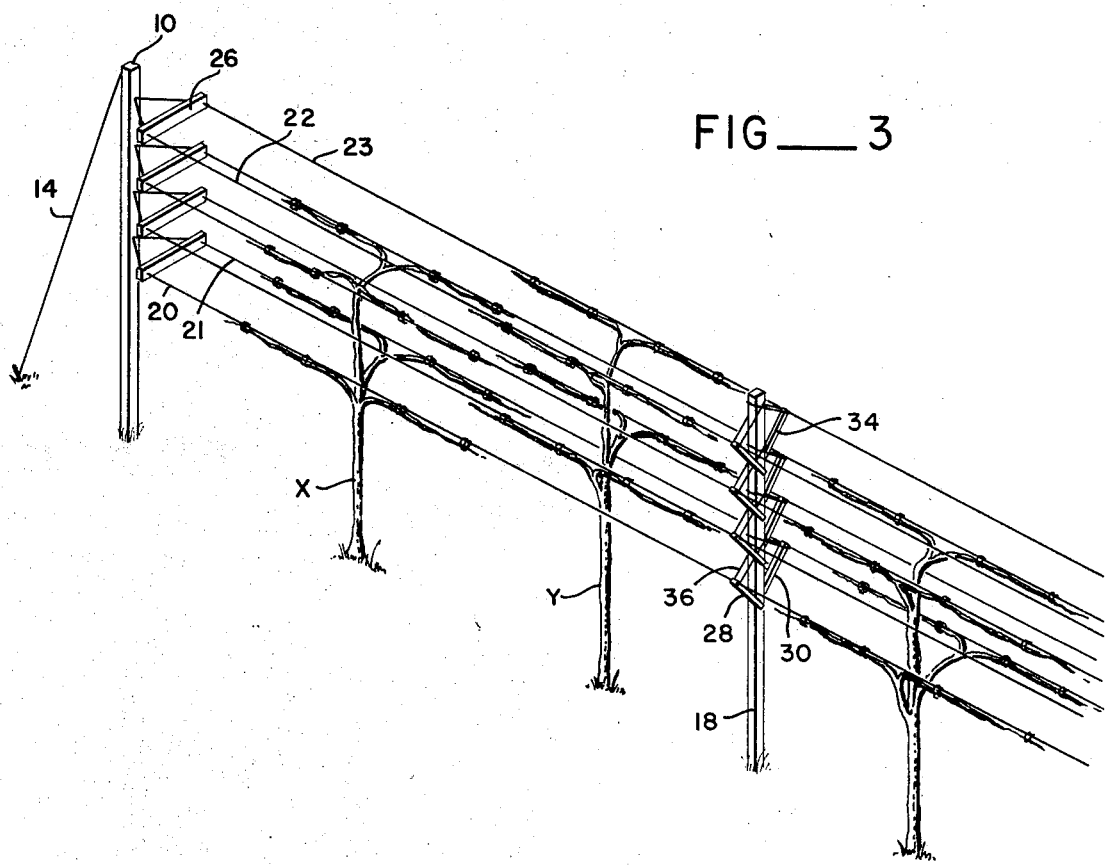
FIG __ 3
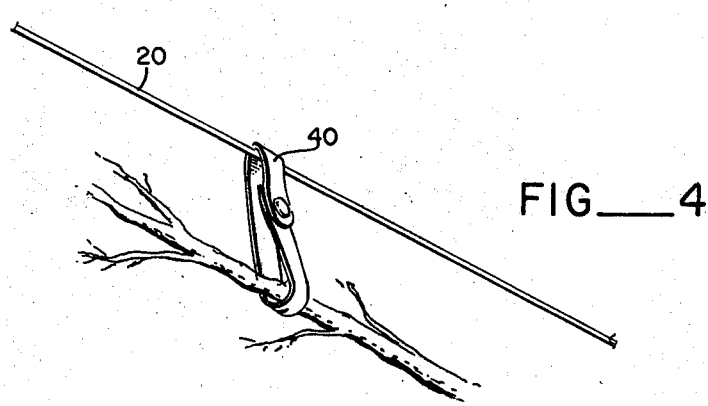
FIG __ 4
HENRY SIEBOL
    INVENTOR.
BY *Seed, Berry & Downey*
ATTORNEYS

3,526,993
ORCHARD TRELLIS SYSTEM
Henry Sieboi, Rte. 1, Outlook, Wash. 98938
Continuation of application Ser. No. 656,761, July 28, 1967. This application Jan. 21, 1969, Ser. No. 796,285
Int. Cl. A01g *17/06*
U.S. Cl. 47—46                                     7 Claims

ABSTRACT OF THE DISCLOSURE

An orchard trellis comprises wire strung between end posts with intermediate wire strand-supporting posts. The intermediate posts support the fruit bearing sections of fruit plants in a manner permitting shaking of the wire strand to dislodge the fruit. Fruit trees, e.g. apple trees, may be closely-spaced in trellis-supported rows in a manner whereby four or more principle fruit bearing branches of each tree are attached to the wire strands without interference from immediately adjacent plants.

---

This application is a continuation of application Ser. No. 656,761, July 28, 1967, now abandoned.

In brief, this invention relates to an orchard trellis and to its application as a support system for fruit plants, particularly as applied to apple trees.

A major problem in fruit orchards, such as apple orchards, is the difficulty in properly supporting the fruit bearing limbs against breakage due to the weight of the fruit. The usual procedure is to prop up the limbs with stakes. This is not altogether satisfactory, however, because the stakes can be fairly easily knocked or blown down. Furthermore, the multiplicity of stakes that are usually required interferes with the picking of the fruit.

Another problem is the usual orchard system of planting fruit trees in rows and permitting them to grow in all directions in a relatively unrestricted manner, with pruning being restricted to enhancing the growth of new fruitwood in directions convenient for fruit picking. This system is wasteful of space in that it limits "per acre" fruit production. Furthermore, this system is not particularly suitable for mechanically picking fruit inasmuch as a mechanical fruit picker would have to be provided with a picking mechanism adapted to maneuver over or around the entire volume of the tree.

The orchard trellis of the present invention comprises wire strung between end posts with wire strand-supporting posts positioned intermediate the end posts. These intermediate posts have arms pivotally connected to the posts and interconnected to the wire strands. These posts also have braces extending from the posts to their respective arms to prevent the arms from pivoting downward due to the weight of the fruit bearing tree sections supported by the wire strands or small cables.

Fruit trees are planted along the trellis, generally in line with the posts. By proper pruning, grafting and training, the fruit bearing sections of the fruit trees will grow proximately to the wire strands and will be tied thereto by straps or the like.

IN THE DRAWINGS

FIG. 1 is a perspective view of an exemplary orchard trellis;

FIG. 2 is a perspective detail view of a typical wire strand supporting post;

FIG. 3 is a perspective view of another exemplary orchard trellis; and

FIG. 4 is a perspective view of an exemplary strap for supporting fruit bearing stock from the trellis.

Referring specifically to the figures, the orchard trellis of this invention comprises a pair of end posts 10 and 12 suitably reinforced with guy wires 14 and 16, respectively. In the FIG. 1 embodiment two wire strand supporting posts 18—18 are positioned intermediate of and in line with the end posts. The height of the posts can be varied from orchard to orchard depending upon the height of the fruit bearing sections of the fruit plants to be supported. Wire is attached to and strung between the end posts so as to provide two vertically-displaced sets of wire strands, each set comprising horizontally spaced apart wire strands, as 20–21 and 22–23. The wire strands of each set extend in a generally horizontally parallel relation between spacer bars, as 24–25 and 26–27, that are closely positioned to the end posts as shown. In the particular embodiment shown in FIG. 1, the wire strands converge from their respective spacer bars into the end posts.

Each intermediate post 18 is provided with two sets of two wire strand supporting arms each, as 28–30 and 32–34. The arms of each set are pivotally bolted to opposite faces of the post at an elevation below the elevation of the respective set of supported wire strands, as shown in FIG. 2, and extend upwardly and outwardly on opposite sides of the post of the respective wire strand. The outer end of each arm is provided with a transverse hole through which the respective wire strand is passed during the stringing of the wire.

Brace sets for each arm set are provided, each set being in the form of wire guy loops as 36–38 and 40–42. The guy loops of each set extend through the post at an elevation above the elevation of the respective set of supported wire strands and extend downward and outwardly on opposite sides of the post to the end of the respective arms. Each guy loop passes over the respective supported wire strand and around and under the end of the respective arm. Thus, the arms are restricted against downward movement beyond the distance spanned by the guy loops. Yet the arms are free to move upward without restraining from the guy loops as shown in dotted line in FIG. 2. This structure permits the picking of fruit, such as apples, by shaking the wire strands to dislodge the fruit. If desired, the width between the upper wire strands 22–23 may be sufficiently greater than the width between the lower wire strands 21–22 to enable the fruit from the branches supported by the upper strands to fall clear of the lower strand when shaken off.

In the utilization of this orchard trellis with apple trees, it is preferred that dwarf or semi-dwarf root stock be employed such that the trees can be planted as close together as on 4 foot centers with every other plant supported by the lower set of wire strands 20–21 and with the intervening alternate plants supported by the upper set of wire strands 22–23. This arrangement may be accomplished as follows, taking the plants designated X and Y in FIG. 1 as examples. The plant X is grown for support by the lower set of wire strands and the plant Y is grown for support by the upper set of wire strands. At elevation somewhere between the ground and the respective set of wire strands, e.g. at about mid-distance as shown in FIG. 1, the root stock is topped (points $X_1$ and $Y_1$, respectively) which will result in the growth of two main trunks $X_2$–$X_3$ and $Y_2$–$Y_3$, respectively. Then main trunks are trained outward as they grow, transverse to the wire strands. When the main trunks reach about the height of their respective set of wire strands, as points $X_4$–$X_5$ and $Y_4$–$Y_5$, respectively, these trunks are topped. Two fruit bearing stocks $X_6$–$X_7$ and $Y_6$–$Y_7$ respectively, are either grafted thereto at each point $X_4$–$X_5$ and $Y_4$–$Y_5$, respectively or the trees are pruned or trained to duplicate the result. Then fruit bearing stock is trained along the respective wire strand in opposite directions and attached thereto by straps 40. Straps 40 may be of any suitable material and may be of any configuration that will not injure the wood, the arrangement shown in FIG. 4 trellis rows spaced about 10 feet apart.

The arrangement of apple trees is particularly desirable in producing red delicious and yellow delicious apples. Generally speaking, there must be species of each type in the same orchard to ensure adequate pollenization. Thus, the X trees could all be red delicious and the intervening Y trees could all be yellow delicious, or vice versa. This would greatly simplify picking since there would be little or no likelihood of intermixing the two types during picking. This is especially true if a mechanical picker were employed which would move between the trellis rows with picker mechanisms contacting the wire strands and shaking them to dislodge the apples. On one pass, only the lower strands would be shaken and on the next pass the upper strands would be shaken.

Such an arrangement permits unusually close tree spacing without the principal fruit bearing branches from adjacent trees becoming entangled or interlocked. Of course there may be other pruning and grafting arrangements whereby such close spacing and non-entanglement can be accomplished with the orchard trellis of this invention.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

For example, the intermediate posts would be provided with four vertically-spaced sets of arms for four corresponding sets of wire strands as shown in FIG. 3. In an eight foot post, the first, or lowest, arm set could be pivotally attached to the post 36 inches above the ground and the other arm sets vertically spaced apart on 18 inch centers. The arms of the lowest set could be 24 inches in length; the next, 30 inches in length; the next 36 inches in length, and the top, 42 inches in length so that the fruit from each level can fall free of the lower arms. Where yellow (or golden) and red delicious apple trees are grown as discussed above, alternate arm sets would support each tree type—resulting in two sets of strands carrying each type—and the trees therefore could be higher without interference of their fruit bearing limb.

What is claimed is:

1. An orchard trellis for supporting the fruit bearing sections of fruit plants which comprises a pair of end posts spaced apart; wire strung between said end posts and fixedly connected thereto in a manner to provide at least two plant supporting strands spaced horizontally apart; and at least one strand supporting post positioned intermediate of the end posts between the supporting strands, at least two arms each interconnected to one supporting strand and pivotally connected to the intermediate post at an elevation below the elevation of the respective wire strand, and guy loops each attached to said intermediate post at an elevation above the elevation of the respective wire strands and extended around and under the end of one of said arms and over the wire strand connected to such arm to restrict downward movement of said arms due to the weight of fruit plants supported by said supporting strands without restricting upward movement of said arms; and a plurality of strap loops enclosing said supporting strands and depending therefrom each strap loop being of sufficient length to also loosely enclose a fruit bearing limb below the respective supporting strand.

2. The trellis of claim 1 wherein said wire is strung so as to provide two vertically-displaced sets of wire strands, each set having two horizontally spaced apart strands; and wherein each intermediate post is provided with two sets of strand supporting arms, one set for each set of wire strands, the arms of each set being pivotally connected to its intermediate post at an elevation below the elevation of the respective wire strands to which the arms are interconnected; and wherein said guy loops are attached to their post at an elevation above the elevation of the respective wire strands to which their respective arms are interconnected.

3. The trellis of claim 2 including spacers adjacent said end posts and interconnecting said horizontally spaced apart strands to space the wire strands of each set apart such that the spacing between the strands of the upper set is greater than the spacing between the strands of the lower set.

4. The trellis of claim 1 wherein said wire is strung so as to provide four vertically-displaced sets of wire strands; and wherein each intermediate post is provided with four sets of strand supporting arms, one set for each set of wire strands, the arms of each set being pivotally connected to its intermediate post at an elevation below the elevation of the respective wire strands to which the arms are interconnected; and wherein said guy loops are attached to their post at an elevation above the elevation of the respective wire strands to which their respective arms are interconnected.

5. An orchard trellis system which comprises a plurality of wire strand supporting members; wire strung between said members so as to provide plant supporting strands horizontally spaced apart adapted to train and support a plurality of fruit bearing limbs of fruit trees intermediate said members, each fruit tree having a generally Y-shaped root stock arranged essentially normal to the supporting strands with two fruit bearing limbs extending from each main branch of the root stock and extending outward in opposite directions essentially parallel to said supporting strands; and strap loops enclosing said supporting strands and depending therefrom, each strap loop being of sufficient length to loosely enclose and suspend the respective fruit bearing limb below the respective supporting strand.

6. The system of claim 5 wherein said members comprise posts having strand-supporting arms pivotally connected thereto and to said strands, and guy loops attached to said posts and enclosing said arm to restrict downward movement of said arms due to the weight of fruit plants supported by said strands without restricting upward movement of said arms.

7. The system of claim 5 wherein said wire is strung to provide two vertically-displaced sets of wire strands, each set having two strands horizontally spaced apart; the lower set of wire strands adapted to train and support fruit bearing limbs of every other fruit tree and the upper set of wire strands adapted to train and support fruit bearing limbs of alternate fruit trees.

References Cited

UNITED STATES PATENTS

| | | | |
|---|---|---|---|
| 193,969 | 8/1877 | Laprade | 47—46 |
| 542,821 | 7/1895 | Broughton et al. | 47—44 |
| 941,894 | 11/1909 | Stetson | 47—45 |

FOREIGN PATENTS

| | | |
|---|---|---|
| 543,803 | 6/1922 | France. |

ROBERT E. BAGWILL, Primary Examiner